(12) United States Patent
Fletcher

(10) Patent No.: US 8,655,780 B2
(45) Date of Patent: Feb. 18, 2014

(54) PERSON-TO-PERSON PAYMENTS: CONTEXTUAL SPENDING

(71) Applicant: eBay Inc., San Jose, CA (US)

(72) Inventor: Charles Dale Fletcher, San Jose, CA (US)

(73) Assignee: eBay, Inc., San Jose, CA (US)

( * ) Notice: Subject to any disclaimer, the term of this patent is extended or adjusted under 35 U.S.C. 154(b) by 0 days.

(21) Appl. No.: 13/768,981

(22) Filed: Feb. 15, 2013

(65) Prior Publication Data

US 2013/0159175 A1    Jun. 20, 2013

Related U.S. Application Data

(63) Continuation of application No. 11/959,875, filed on Dec. 19, 2007, now Pat. No. 8,380,624.

(51) Int. Cl.
*G06Q 40/00* (2012.01)
*G06Q 30/00* (2012.01)

(52) U.S. Cl.
USPC .............................. 705/40; 705/14.1; 705/35

(58) Field of Classification Search
USPC .................................. 705/14, 1, 35–45, 14.1
See application file for complete search history.

(56) References Cited

U.S. PATENT DOCUMENTS

| | | | | |
|---|---|---|---|---|
| 7,502,760 | B1 * | 3/2009 | Gupta | 705/66 |
| 8,380,624 | B2 | 2/2013 | Fletcher | |
| 2002/0049658 | A1 | 4/2002 | Davidson et al. | |
| 2003/0083932 | A1 * | 5/2003 | Wolf et al. | 705/14 |
| 2003/0130940 | A1 * | 7/2003 | Hansen et al. | 705/39 |
| 2003/0234533 | A1 * | 12/2003 | Kim | 283/71 |
| 2004/0215559 | A1 * | 10/2004 | Rebenack et al. | 705/40 |
| 2005/0017067 | A1 * | 1/2005 | Seifert et al. | 235/379 |
| 2005/0165671 | A1 * | 7/2005 | Meade et al. | 705/37 |
| 2005/0283433 | A1 | 12/2005 | Reid et al. | |
| 2007/0087816 | A1 * | 4/2007 | VanLuchene | 463/25 |
| 2007/0198338 | A1 * | 8/2007 | Heywood | 705/14 |
| 2008/0059303 | A1 * | 3/2008 | Fordyce | 705/14 |
| 2008/0274802 | A1 * | 11/2008 | Joao | 463/25 |

FOREIGN PATENT DOCUMENTS

| | | |
|---|---|---|
| JP | 2008-102842 | 5/2008 |
| KR | 2002084792 A | 11/2002 |
| KR | 2002084792 A * | 11/2002 |

OTHER PUBLICATIONS

Webster's Dictionary and Thesaurus copyright 1989.*
GreenZap Introduces New "Buy Now" Buttons, Enabling Merchants to Accept Payments at No Cost. Business Wire, p NA Aug. 4, 2006.*

(Continued)

*Primary Examiner* — William Rankins
(74) *Attorney, Agent, or Firm* — Schwegman, Lundberg & Woessner, P.A.

(57) ABSTRACT

Receiving at a payment system a request associated with a first party to make a payment to a second party. Recommendations for utilizing the payment are evaluated based on a profile of the second party. The payment and a recommendation for utilization of the payment are sent to the second party. The recommendation that is sent is based on a profile of the second party and may include shopping at a physical store, shopping at an online store, ordering from a catalog, saving in an account, ordering a credit card, ordering a debit card. A transaction fee associated with the payment, and a portion of the fee to be paid by each party is calculated.

22 Claims, 10 Drawing Sheets

(56) References Cited

OTHER PUBLICATIONS greenzapdotcom2 Dec. 5, 2006 http://web.archive.org/web/20061205201856/http://www.greenzap.com/greenzap-send.asp.* greenzapdotcom Dec. 5, 2006 Prospective payment system by GreenZap—Account Comparison.*

"U.S. Appl. No. 11/959,875, Advisory Action mailed Jul. 29, 2010", 3 pgs.

"U.S. Appl. No. 11/959,875, Examiner Interview Summary mailed Sep. 23, 2011", 3 pgs.

"U.S. Appl. No. 11/959,875, Final Office Action mailed Jan. 31, 2011", 21 pgs.

"U.S. Appl. No. 11/959,875, Final Office Action mailed May 13, 2010", 20 pgs.

"U.S. Appl. No. 11/959,875, Final Office Action Mailed Oct. 16, 2009", 8 pgs.

"U.S. Appl. No. 11/959,875, Non Final Office Action mailed May 1, 2009", 12 pgs.

"U.S. Appl. No. 11/959,875, Non Final Office Action mailed May 8, 2012", 6 pgs.

"U.S. Appl. No. 11/959,875, Non-Final Office Action mailed Sep. 30, 2010", 18 pgs.

"U.S. Appl. No. 11/959,875, Non-Final Office Action mailed Oct. 7, 2008", 14 pgs.

"U.S. Appl. No. 11/959,875, Non-Final Office Action mailed Dec. 11, 2009", 13 pgs.

"U.S. Appl. No. 11/959,875, Notice of Allowance mailed Oct. 12, 2012", 10 pgs.

"U.S. Appl. No. 11/959,875, Response filed Feb. 12, 2010 to Non Final Office Action mailed Dec. 11, 2009", 13 pgs.

"U.S. Appl. No. 11/959,875, Response filed Jul. 13, 2010 to Final Office Action mailed May 13, 2010", 11 pgs.

"U.S. Appl. No. 11/959,875, Response filed Aug. 3, 2009 to Non Final Office Action mailed May 1, 2009", 12 pgs.

"U.S. Appl. No. 11/959,875, Response filed Aug. 22, 2012 to Non Final Office Action mailed May 8, 2012", 8 pgs.

"U.S. Appl. No. 11/959,875, Response filed Sep. 2, 2011 to Final Office Action mailed Jan. 31, 2011", 11 pgs.

"U.S. Appl. No. 11/959,875, Response filed Nov. 13, 2009 to Final Office Action mailed Oct. 16, 2009", 11 pgs.

"U.S. Appl. No. 11/959,875, Response filed Dec. 28, 2010 to Non Final Office Action mailed Sep. 30, 2010", 13 pgs.

"U.S. Appl. No. 11/959,875, Response filed Dec. 30, 2008 to Non Final Office Action mailed Oct. 7, 2008", 14 pgs.

"U.S. Appl. No. 11/959,875, Supplemental Response filed Sep. 20, 2011 to Final Office Action mailed Jan. 31, 2011", 9 pgs.

"GreenZap Introduces New "Buy Now" Buttons, Enabling Merchants to Accept Payments at No Cost.", Business Wire, p NA, (Aug. 4, 2006).

"Prospective payment system by GreenZap—Account Comparison.", Greenzap.com—http://web.arch ive.org/web/20061205202306/http://www.greenzap.com/greenzap-acct-co...

"The instant payment solution: GreenZap—instant payment using your email address.", Greenzap.com2—http://web.archive.org/web/20061205201856/http:llwww.greenzap.com/greenzap-send.asp.

"Webster's Dictionary and Thesaurus", Copyright 1989, (1989).

Fletcher, Charles Dale, "Person-to-Person Payments: Contextual Spending", (Jun. 20, 2013), 1.

* cited by examiner

US 8,655,780 B2

PERSON-TO-PERSON PAYMENTS: CONTEXTUAL SPENDING

RELATED APPLICATIONS

The present application is a continuation of prior U.S. application Ser. No. 11/959,875, filed Dec. 19, 2007, now U.S. Pat. No. 8,380,624 issued Feb. 19, 2013, the application of which is incorporated herein by reference in its entirety.

TECHNICAL FIELD

Example embodiments relate generally to the technical field of data communication, and in one specific example, to contextual spending in person-to-person payments.

BACKGROUND

Using online payment systems have been recognized as a convenient and efficient method of payment for products and services by numerous users. Many businesses may also leverage the services that the online payment systems provide. The widespread use of the Internet has provided an efficient and low-cost platform for users to shop online from merchants all over the world and make payments for their purchases via online payment systems such as PAYPAL (a subsidiary of EBAY Inc. San Jose Calif.). PAYPAL would allow users to make payments for purchased items, for example, from the user's PAYPAL account or other bank accounts associated with the users which are linked to the PAPAL account.

BRIEF DESCRIPTION OF THE DRAWINGS

Some embodiments are illustrated by way of example and not limitation in the figures of the accompanying drawings in which.

DETAILED DESCRIPTION

Example methods and systems for contextual spending in person-to-person payments have been described. In the following description, for purposes of explanation, numerous specific details are set forth to provide a thorough understanding of example embodiments. It will be evident, however, to one skilled in the art that the present invention may be practiced without these specific details.

For the purpose of present application, the term "contextual spending" shall be taken to include, but not be limited to, spending an amount transmitted by another party according to one or more recommendations, made by a payment system, contextual to the payment notification sent to a recipient (e.g. a message sent via an email or a Short Messaging Service (SMS)) including a spending recommendation portion providing the recipient with some suggestions pertaining to spending a transmitted amount). Such spending recommendations, hereinafter, may be referred to as "contextual recommendations"

Some embodiments described herein may include a computerized method and a system for contextual spending in person-to-person payments. In example embodiments, a payment system may receive a request from a first party for making a payment to a second party. The payment system may send to the second party one or more recommendations for utilization of the payment (e.g., a payment made to the second party by the payment system on behalf of the first party). The payment system may also request and receive from the first party an instruction related to charging a transaction fee associated with the payment.

Figure 1:
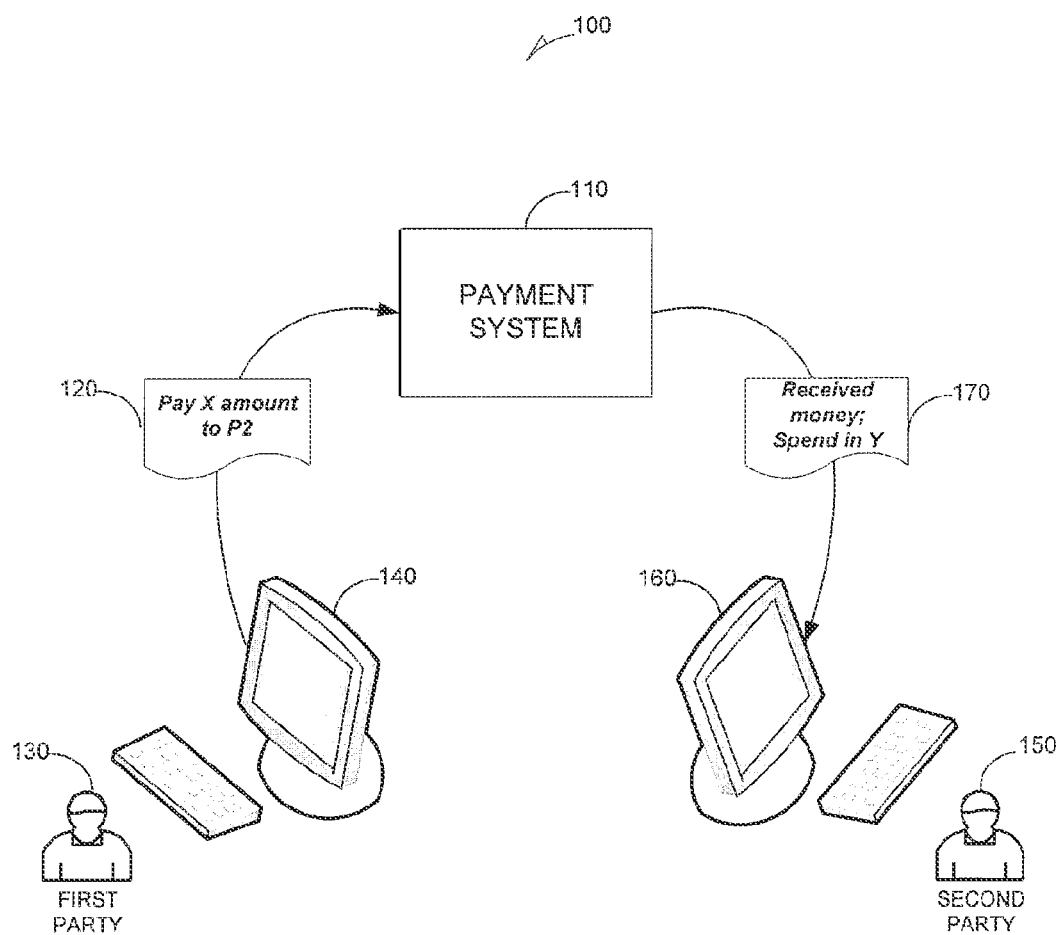
FIG. 1 is a high-level diagram illustrating, in an example embodiment, functionality of a system for contextual spending in person-to-person payments.

FIG. 1 is a high-level diagram illustrating, in an example embodiment, functionality of a system 100 for contextual spending in person-to-person payments. The payment system 110 (e.g., a clearing house such as PAYPAL or a financial institution such as a bank) may receive a request 120 from a first party 130 (e.g., a user a first client machine 140) for making a payment (e.g., of an amount X) by the payment system 110 to the second party 150 (e.g., a user of a second client machine 160). In an example embodiment, the first party 130 may include a commercial entity (e.g., a merchant sending a refund to a customer, or a loan office sending a loan proceed to a student)

In example embodiments, the amount may be withdrawn from an existing account associated with the first party 130 at the payment system 110. The amount may also be withdrawn from a bank account, associated with the first party 130 and linked to the payment system 110. The first party 130 may also authorize the payment system 110 to charge the amount to a credit or a debit card associated with the first party 130. The first party 130 may also send a personal check, money order, or other instruments to the payment system 110 for the amount to be transmitted to the second party 150. Alternatively, the first party 130 may authorize the payment system 110 to withdraw the amount from an account associated with the first party 130 (e.g., an account not linked to the payment system 110).

According to an example embodiment, the payment system 110 may request from the first party 130 an instruction related to charging the transaction fee associated with the payment. The payment system 110 may receive the instruction from the first party 130.

The instruction from the first party 130 may be used to determine shares of the transaction fee to be charged to each of the first party 130 and the second party 150 (e.g., a recipient). The first party 130 may authorize the payment system 110 to charge the transaction fee, partially or entirely, to the first party 130 (e.g., a sender). In case the authorization is for partial charging, the remainder of the transaction fee may be charged to the second party 150. The first party 130 may also instruct the payment system 110 to charge the entire transaction fee to the second party 150.

Example embodiments may include sending by the payment system 110 to the second party 150 a notification message 170 including one or more recommendations regarding a subsequent utilization of the payment (e.g., a received amount transmitted by the first party 130).

Figure 2:
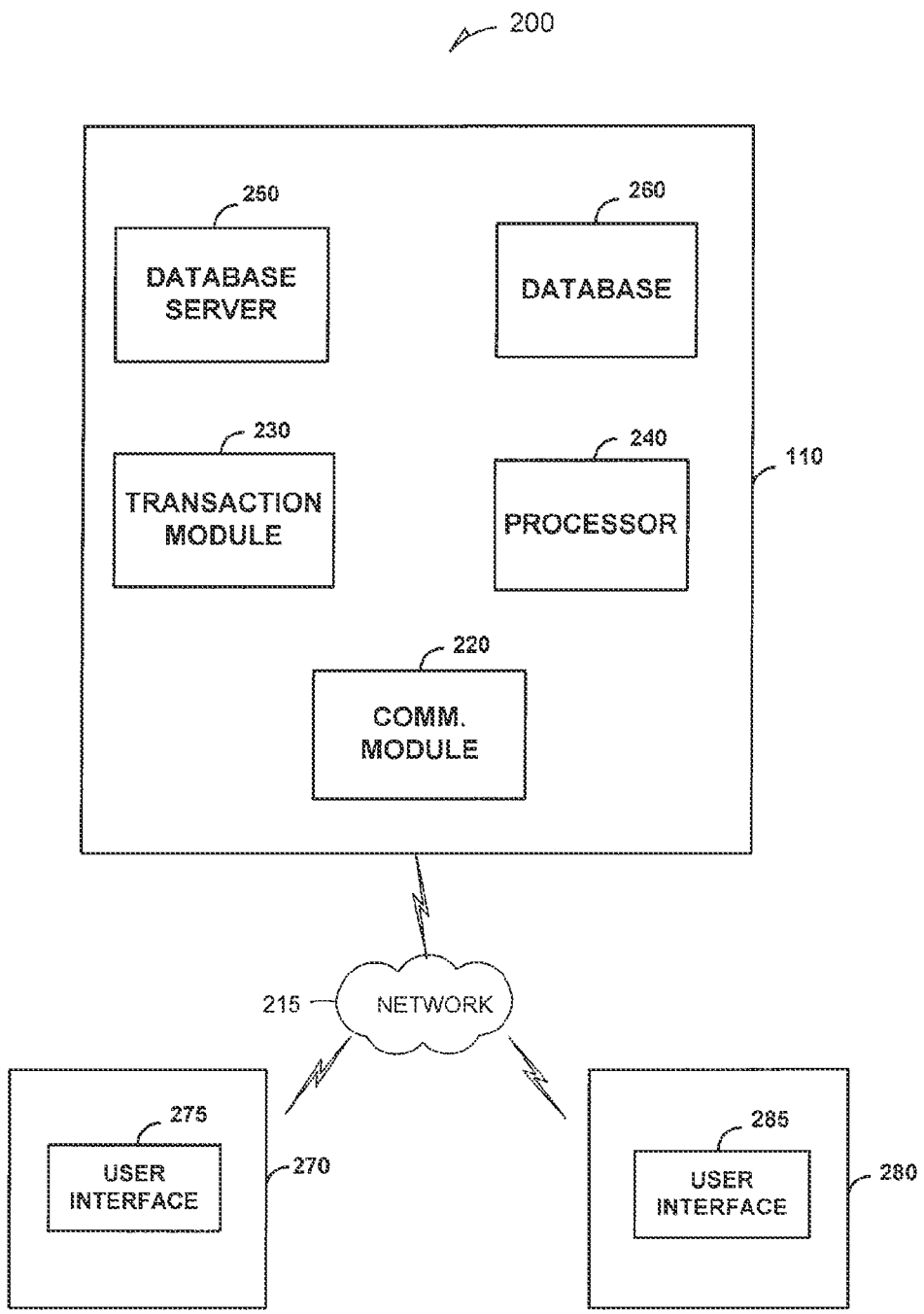
FIG. 2 is a block diagram illustrating, in an example embodiment, a system for contextual spending in person-to-person payments.

FIG. 2 is a block diagram illustrating, in an example embodiment, a system 200 for contextual spending in person-to-person payments. The system 200 may include a payment system 110, a first client system 270, and a second client system 280. The payment system 110 may include a communication module 220, a transaction module 230, a processor 240, a database 260 and a database server 250. The communication module 220 may receive a request 120 from a first party 130 for making a payment to a second party 150.

In example embodiments, the request may include one or more instructions related to charging a transaction fee associated with the payment. The request may also include identification of the second party 150 by a name and an email address or telephone number. In another example embodiment, the communication module 220 may request instructions related to charging the transaction fee from the first party 130. The first party 130 may authorize the payment system 110 to charge the transaction fee, partially or entirely, to the first party 130 (e.g., the sender). In case the authorization is for partial charging, the transaction module may charge the remainder of the transaction to the second party 150 (e.g., the recipient). The first party 130 may also instruct the payment system 110 to charge the entire transaction fee to the second party 150.

The transaction module 230 may complete the transaction, based on the instructions received from the first party, at least by sending the payment to the second party. The transaction module may deduct a share of the transaction fee associated with the second party 150, as defined by the instructions, from an amount requested by the first party 130 to be paid to the second party 150. In case the instructions provide that a portion of the transaction fee (e.g., 50%) would be paid by the first party 130. The transaction module 230 may deduct the portion from the amount paid by the first party 130, in case that the portion is already included in the amount paid by the first party 130. Otherwise, the transaction module 230 may charge the portion of the transaction fee to an account associated with the first party 130.

In example embodiments, the transaction module 230 may fully waive or discount the transaction fee for certain customers (e.g., the customers with a predefined amount in their accounts with the payment system 110, or other preferred statuses), the customers being the first party 130 and/or the second party 150. The account information and the statuses of the first party 130 and/or the second party 150 may be obtained by the processor 240 from the database 260 by making calls to the database server 250. The processor 240 may use the information to make suggestions regarding any discount or waiver of the transaction fee to the transaction module 230.

According to an example embodiment, the processor 240 may generate one or more recommendations to be sent to the second party 150 regarding a subsequent utilization of the payment. The recommendations, also referred to as "contextual recommendations," generated by the processor 240 may include one or more actions such as shopping from a merchant that may pay a referral fee or at an affiliate online store (e.g. PAYPAL shops), ordering from a catalog, saving in an account (e.g., a PAYPAL account), investing in a fund (e.g., money market funds) or applying for a card (e.g., a credit or a debit card).

In an example embodiment, the processor 240 may generate the recommendations based on a profile of the second party 150 (recipient). The processor 240 may obtain the profile from a source including the database 260 or a database associated with a publication system storing transactions associated with the second party (e.g. eBay databases), or a public/commercial database (e.g., databases associated public organizations or private commercial entities). The profile may, for example, include a geographic location (e.g., country, Zip code, city, street address, etc.) a spending behavior (e.g., being a heavy shopper, preferring a certain shop or a group of shops or a method of payment, having/not having applied for certain credit cards or the like an investment portfolio (e.g., investments in stocks, mutual funds, retirement plans, etc.), a financial standing, or interests (e.g., hobbies, sports, categories of items or brands of interest, etc.). The communication module 220 may communicate the recommendations to the second party 150.

in example embodiments, the first party 130 may use the user interface 275 to communicate with the payment system 110 via a network 215. The user interface 275, for example, may be used by the first party 130 to send a request for payment to a second party 150 or for providing the instructions to determine the shares of each of the first part 130 and the second party 150 from the transaction fee charged by the payment system 110.

The user interface 285 may be used by the second party 150 to receive messages and recommendations from the payment system 110. The messages may include notifications regarding the receipt of a payment to the second party. The notification may indicate the amount of the payment received from the first party 130. The notification may also include a name and/or an email address/telephone number of the first party 130. The second party may use the user interface 285 to respond to the recommendations by, for example, applying for a debit card, or the like.

Figure 3:
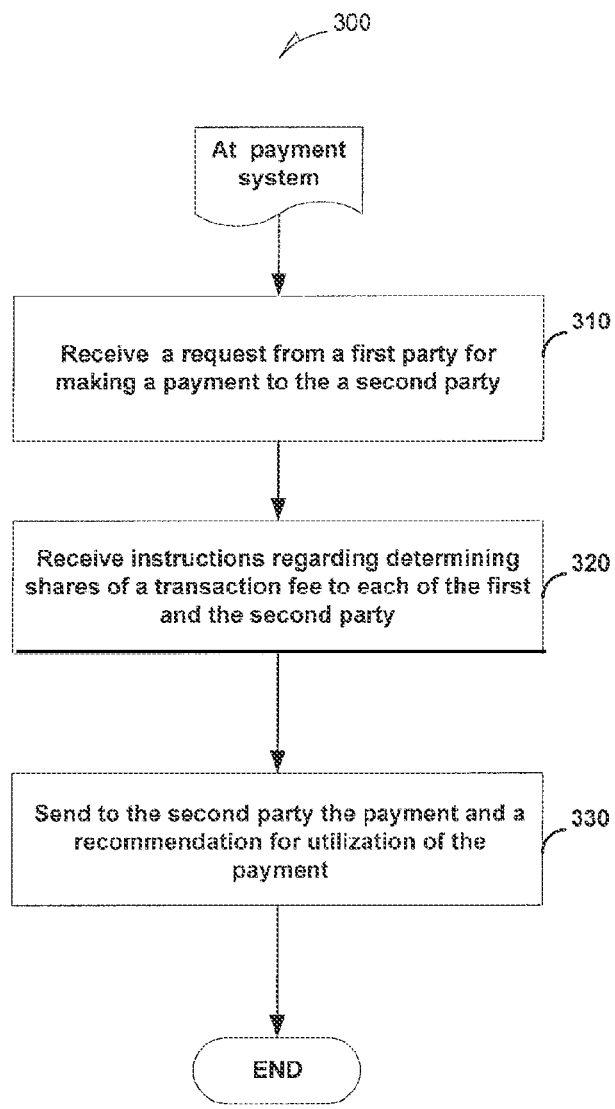
FIG. 3 is a flow diagram illustrating an example embodiment of a method for contextual spending in person-to-person payments.

FIG. 3 is a flow diagram illustrating an example embodiment of a method 300 for contextual spending in person-to-person payments. The flow diagram describes the method from the point of view of the payment system 110. At operation 310, the communication module 220 may receive form a first party 130 a request 120 for making a payment of an amount requested by the first party 130 to the second party 150 by the payment system 110.

According to an example embodiment, the payment system 110 may, at operation 320, receive one or more instructions, from the second party 150. The instructions may determine the shares of a transaction fee that might be charged by the payment system 110, to each of the first and the second parties 130 and 150. The transaction module 230 may complete the transaction based on the instructions from the first party 130. In example embodiments, the payment system may waive or discount the transaction fee, based on a preferred status of the first and/or the second party.

In an example embodiment, at operation 330, the communication module 220 may communicate one or more recommendations, generated by the processor 240, to the second party 150. The recommendations may suggest ways for subsequent utilization of the paid amount by the first party 130 to the second party 150. The recommendations may include one or more actions such as shopping from a merchant that may pay a referral fee or at an affiliate online store (e.g. PAYPAL shops), ordering from a catalog, saving in an account (e.g., a PAYPAL account), investing in a fund (e.g., money market funds) or applying for a card (e.g., a credit or a debit card). The recommendations may be made based on a profile of the second party obtained from the database 260 or other databases (see description of FIG. 2 for more details).

Figure 4:
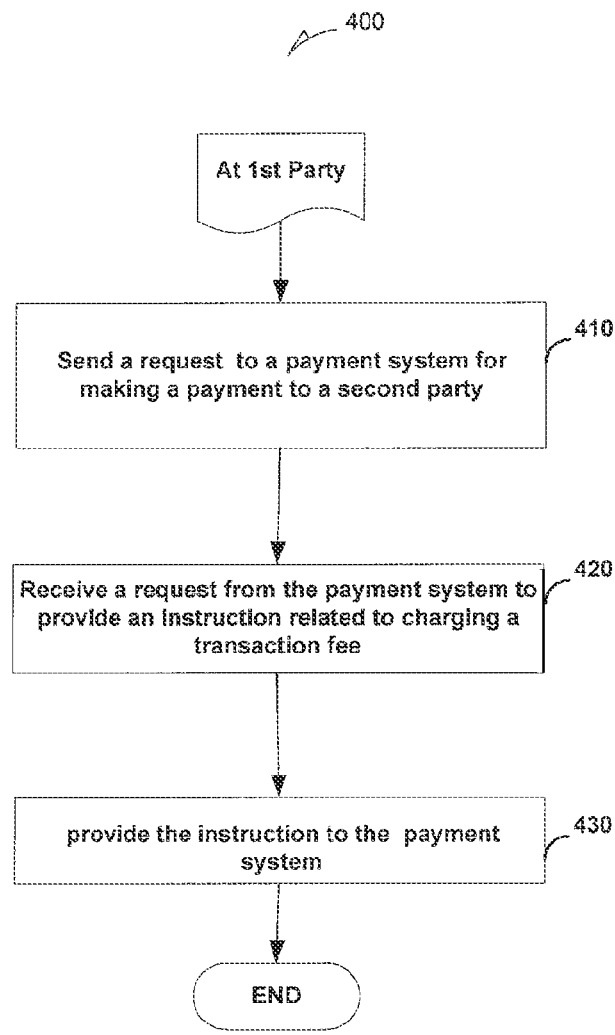
FIG. 4 is a flow diagram illustrating, in another example embodiment, a method for contextual spending in person-to-person payments.

FIG. 4 is a flow diagram illustrating, in another example embodiment, a method 400 for contextual spending in person-to-person payments. The flow diagram describes the method 400 from a point of view of a sender (e.g., the first party 130). The method 400 starts at operation 410, where the first party 130 may use the user interface 175 to send the request 120 for a transaction to the payment system 110. The transaction may include a payment of an amount requested by the first party 130 to be made to the second party 150 (recipient) by the system 110.

At operation 420, the first party 130 may receive a request from the payment system 110 to provide one or more instructions related to charging a transaction fee. The first party 130, at operation 430, may provide the one or more instructions determining the shares of the transaction fee to each of the first and the second party. In example embodiments the payment system 110 may waive or discount the transaction fee as explained under the description of FIG. 2.

Figure 5:
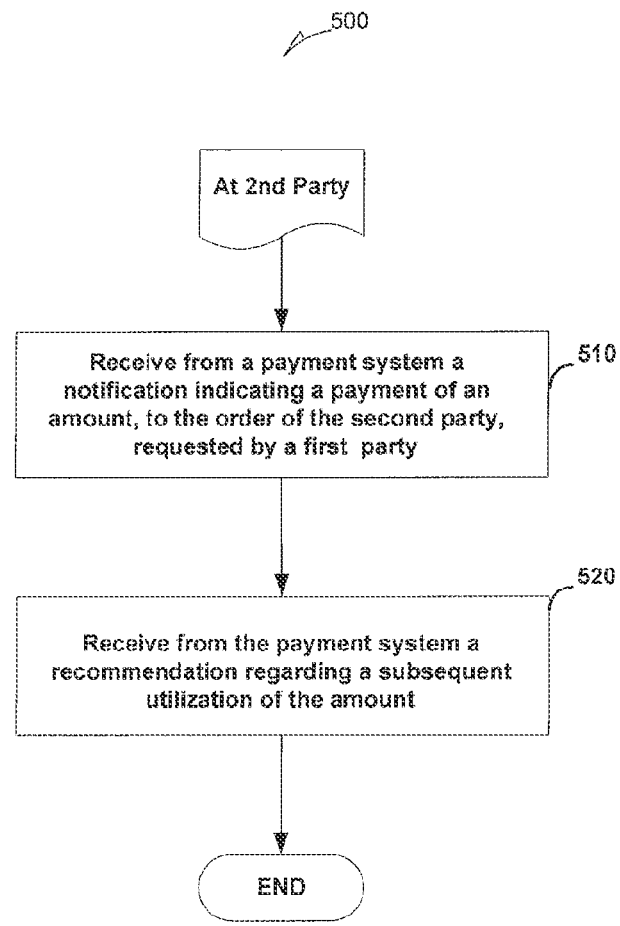
FIG. 5 is a flow diagram illustrating, an alternative example embodiment of a method for contextual spending in person-to-person payments.

FIG. 5 is a flow diagram illustrating, an alternative example embodiment of a method 500 for contextual spending in person-to-person payments. The flow diagram describes the method from a point of view of the recipient (the second party 150) of an amount paid by the first party 130. In an example embodiment, the second party 150 may receive form the payment system 110 a notification. The notification may indicate that the first party 130 has requested the payment system 110 to make a payment to the second party 150. The notification may include an amount, a date and the name and email address and/or a telephone number associated with the first party.

According to an example embodiment, a net amount paid to the second party 150 may be equal or less than the amount that the first party 130 requested the payment system 110 to pay to the second party 150, depending on whether any transaction fee is charged or not. The share of the second party 150 from the transaction fee is determined by one or more instructions provided by the first party 130.

According to an example embodiment, the second party 150 may also receive, from the payment system 110, one or more recommendations regarding subsequent utilization of the net amount paid to the second party 150. The recommendations may be based on a profile of the second party 150 as explained under the description of FIG. 2. The recommendations may include one or more actions such as shopping from a merchant that may pay a referral fee or at an affiliate online store (e.g. PAYPAL shops), ordering from a catalog, saving in an account (e.g., a PAYPAL account), investing in a fund (e.g., money market funds) or applying for a card (e.g., a credit or a debit card).

Figure 6:
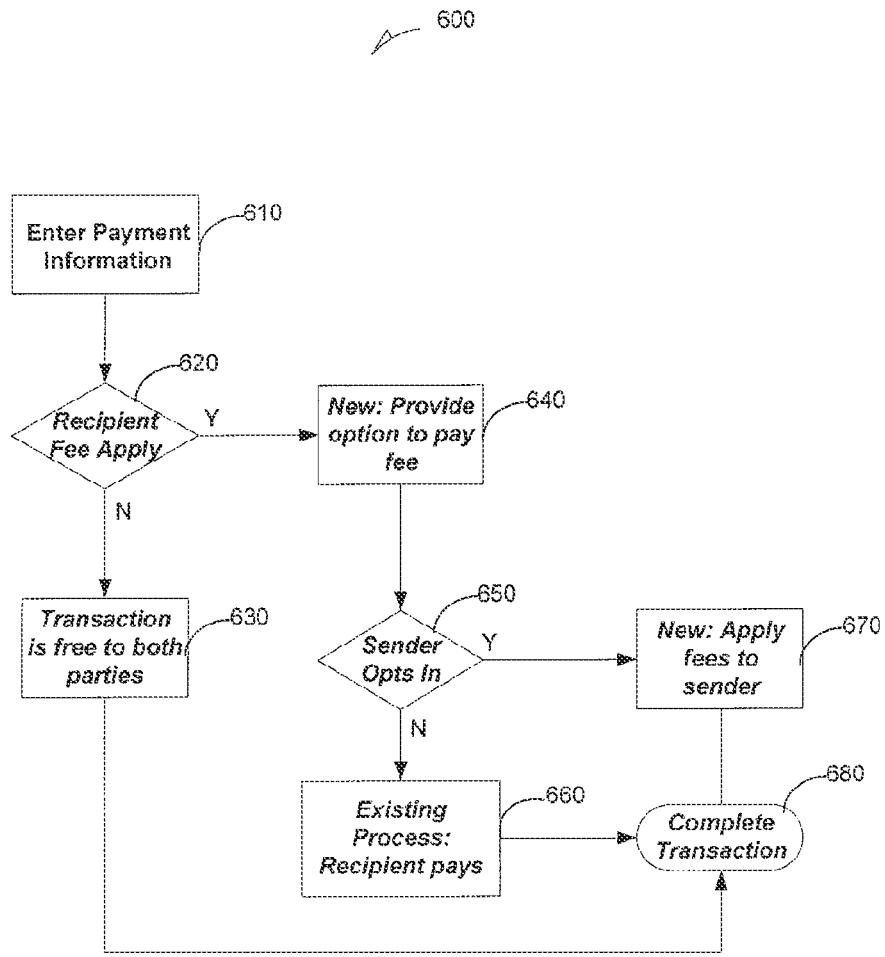
FIG. 6 is a flow diagram illustrating, an example embodiment of a transaction process in a person-to-person payment system.

FIG. 6 is a flow diagram illustrating, an example embodiment of a transaction process 600 in a person-to-person payment system. The transaction process 600 starts at operation 610, where the first party 130 may enter information including a request for a payment of an amount, by the payment system 110, to the second party 150. At control operation 620, the payment system 110, may determine whether a transaction fee may be applied. In case no transaction is charged, the control is passed to operation 630, where the parties may be notified that no transactions fee was charged and the transactions moves to completion at operation 680, where the total amount paid by the first party 130 is paid to the second party 150.

However, in case that the payment system 110 decides that a transaction fee would be charged, at operation 640, the first party 130 is provided with the option of paying the transaction fee or request that the second party 150 pay the entire transaction fee or a defined portion of the fee, as defined by the first party 130. In case, at control operation 650, the first party 130 decides not to pay any portion of the transaction fee, at operation 660, the default operation, e.g., deduction of the transaction fee from the paid amount may be performed and the control is passed to operation 680 where the payment system 110 completes the transaction. In case where the first party 130 decides to pay all or part of the transaction fee, at operation 670, the payment system 110 may, accordingly, apply the fee to the first party 130 and the second party 150 and complete the transaction (operation 680) by charging the first party 130 an accepted portion (by the first party 130) of the transaction fee and deducting the remaining portion of the fee from the payment requested to be paid to the second party 150 and paying a net amount to the second party 150. The net amount may be equal to the difference between the requested payment and the remaining portion of the transaction fee.

Figure 7:
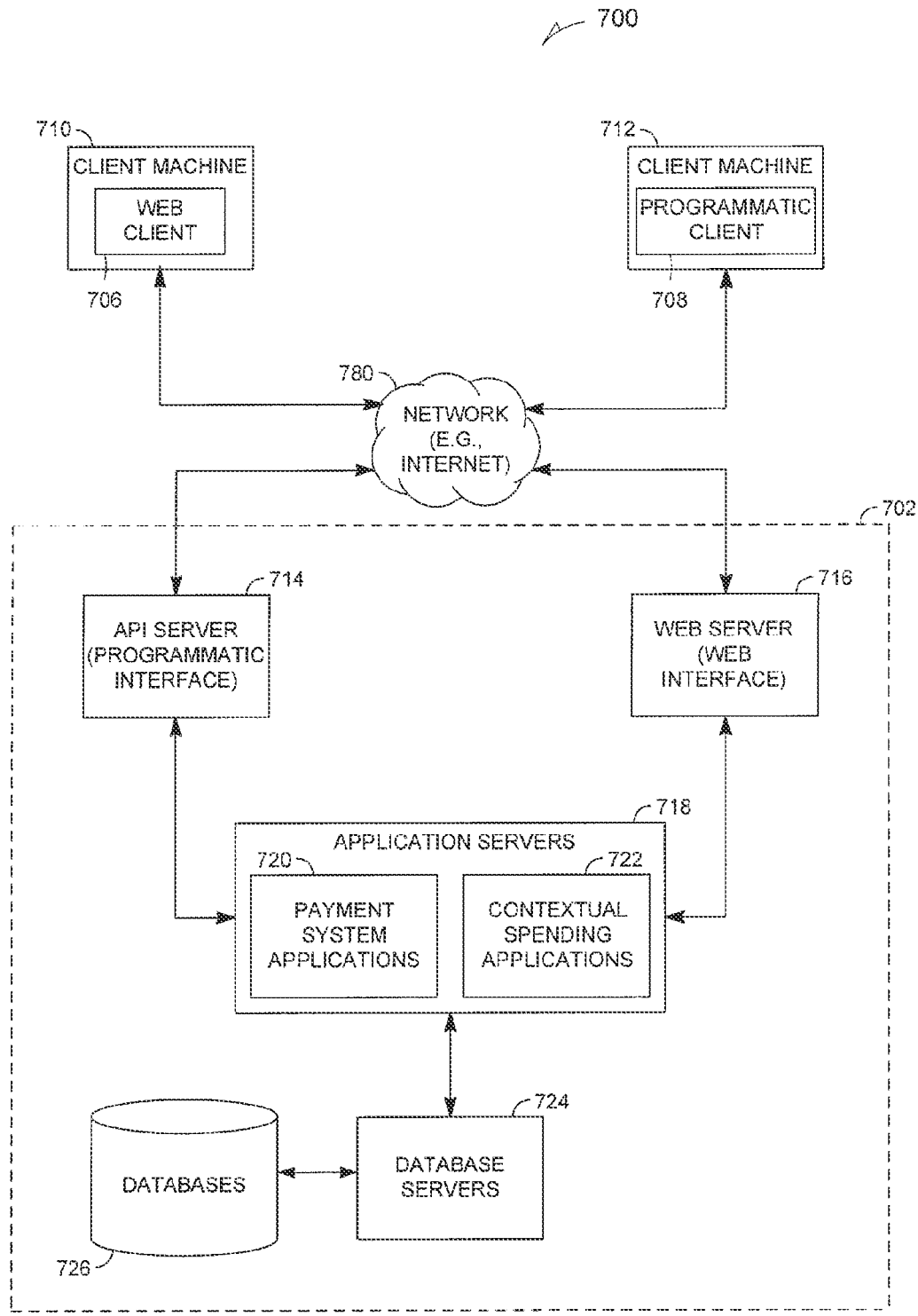
FIG. 7 is high-level block diagram illustrating, in an example embodiment, a network-based payment system applying contextual spending in person-to-person payments.

FIG. 7 is high-level block diagram illustrating an example network-based payment system 700, having a client-server architecture for facilitating context-based real-time advertising. The network-based payment system 700, in the example form of a network-based system contextual spending system 702, provides server-side functionality, via a network 780 (e.g., the Internet) to one or more clients. FIG. 7 illustrates, for example, a Web client 706 (e.g., a browser, such as the INTERNET EXPLORER browser developed by MICROSOFT CORPORATION of Redmond, Wash.), and a programmatic client 708 executing on respective client machines 710 and 712.

Turning to the network-based system contextual spending system 702, an Application Program Interface (API) server 714 and a Web server 716 are coupled to, and provide programmatic and Web interfaces respectively to, one or more application servers 718. The application servers 718 host one or more payment system applications 720 and contextual spending applications 722. The application servers 718 are, in turn, shown to be coupled to one or more database servers 724 that facilitate access to one or more databases 726.

The payment system applications 720 provide a number of payment functions and services to users who access the network-based contextual spending system 702. The contextual spending applications 722 facilitate real-time contextual spending in person-to-person payment activities over the network 780.

Further, while the network-based payment system 700 shown in FIG. 7 employs a client-server architecture, the present application is of course not limited to such an architecture and could equally well find application in a distributed, or peer-to-peer, architecture system. The various payment system and contextual spending applications 720 and 722 may also be implemented as standalone software programs, which do not necessarily have networking capabilities.

It should be appreciated that the Web client 706 may access the various payment system and contextual spending applications 720 and 722 via the Web interface supported by the Web server 716. Similarly, the programmatic client 708 accesses the various services and functions provided by the payment system and contextual spending applications 720 and 722 via the programmatic interface provided by the API server 714. The programmatic client 708 may, for example, include registration applications to provide interested users (e.g., users of the network-based payment system) with registration forms to sign up for an online person-to-person payments including contextual spending programs.

The programmatic client 708 may also include communication applications to perform batch-mode communications between the programmatic client 708 and the network-based contextual spending system 702.

Figure 8:
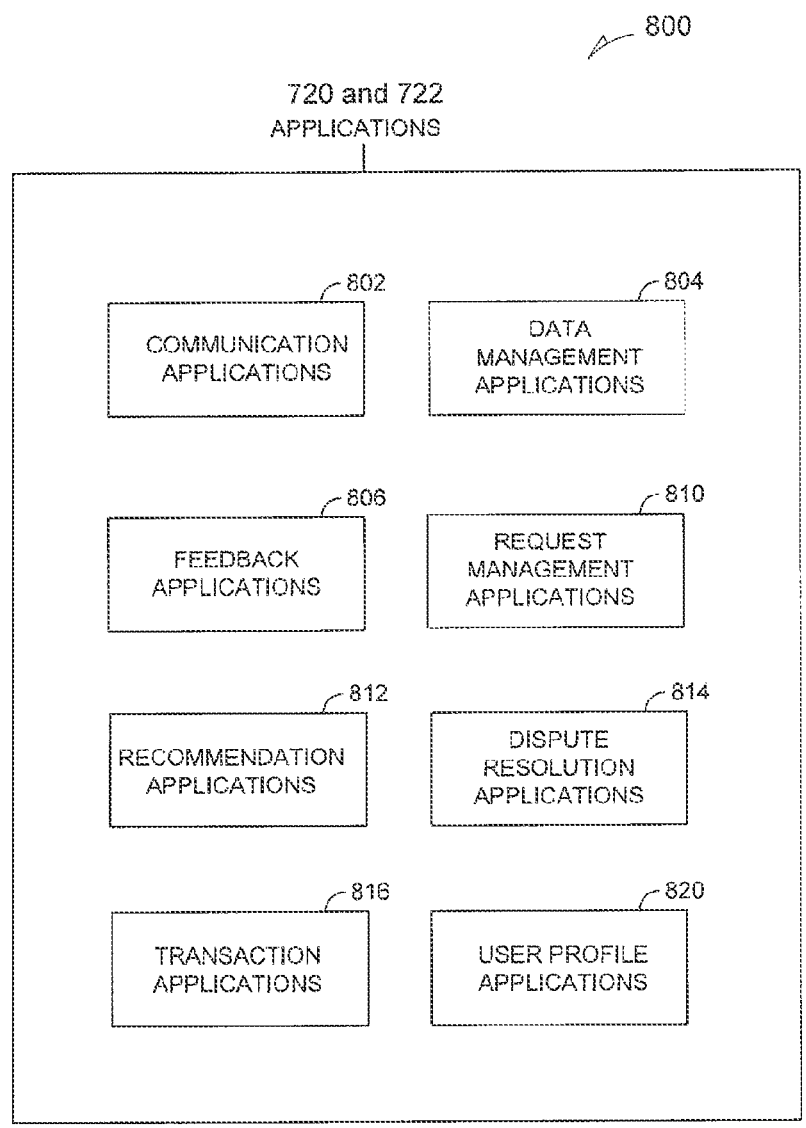
FIG. 8 shows an example set of applications used by the network-based payment system of FIG. 7.

FIG. 8 shows an example set of applications 800 included in the applications 720 and 722 served by the application server 718 used by the network-based payment system of FIG. 7. The network-based payment system 700 may provide a number of online payment mechanisms including a person-to-person payment system which may facilitate for a user to pay an amount to another person using the network-based payment system 700. The applications 800 are shown to include one or more communication applications 802 that support various communications between the network-based payment system 700 and users of the system including a first party requesting payment, by the network-based payment system 700, of an amount to a second party.

The various data management applications 804 may also provide a number of features in support of actions such as making contextual recommendations. The data managed by the data management applications 804 may include user profile data such as user transaction history. A number of feedback applications 806 may allow the users of the network-based payment system 700 to evaluate services provided by the system including person-to-person payments and contextual recommendations. Such feedbacks may be effective in enhancement of the level of services by modifying the system based on the feedbacks received from the users.

Request management applications 810 may support the users that request the network-based payment system 700 to make payment to other parties. The request management applications 810 may use transaction applications 816, user profile applications 820, and recommendation applications 812 to fulfill the requests. The user profile applications may utilize the services of the data management applications 804 to retrieve data defining a profile of a user of the network-based payment system 700. The profile may be assessed by the recommendation applications 812 in order to provide relevant contextual recommendations to users who receive some amount form another party via the network-based payment system 700.

The transaction applications may support completing transactions requested by the users of the network-based payment system 700. Such requests may be related to making a payment to a second party. The transaction applications 816 may also seek instruction from a first party who requests the network-based payment system 700 for a transaction including making a payment to a second party. The instructions may determine the share of the first and the second party from a transaction tee charged by the network-based payment system 700.

Dispute resolution applications 814 provide mechanisms whereby disputes arising between transacting parties may be resolved. For example, the dispute resolution applications 814 may provide guided procedures whereby the parties are guided through a number of steps in an attempt to settle a dispute. In the event that the dispute cannot be settled via the guided procedures, the dispute may be escalated to a third party mediator or arbitrator.

Example Machine Architecture

Figure 9:
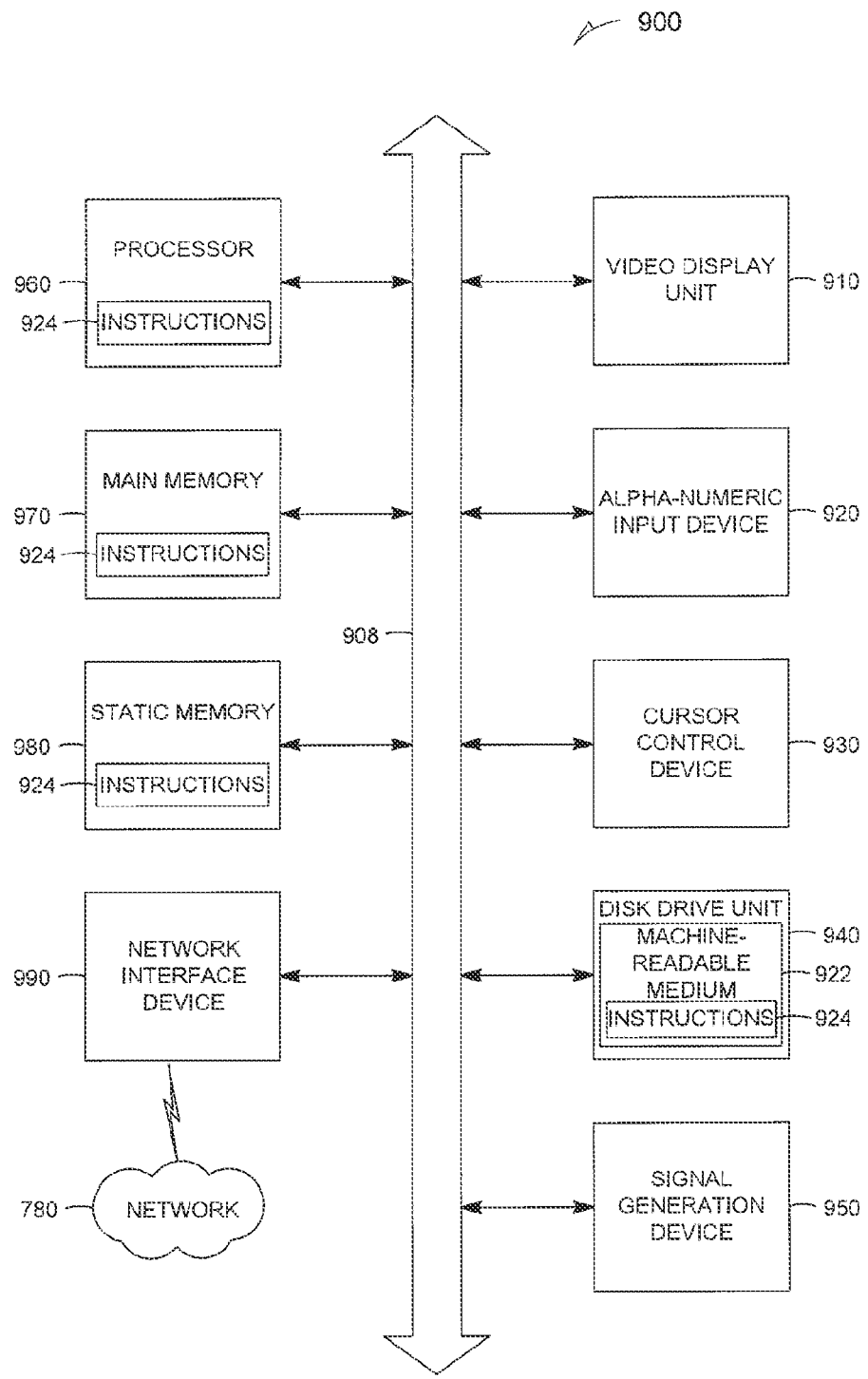
FIG. 9 is a block diagram illustrating a diagrammatic representation of a machine in the example form of a computer system.

FIG. 9 is a block diagram, illustrating a diagrammatic representation of machine 900 in the example form of a computer system within which a set of instructions for causing the machine to perform any one or more of the methodologies discussed herein may be executed. In alternative embodiments, the machine 900 may operate as a standalone device or may be connected (e.g., networked) to other machines. In a networked deployment, the machine 900 may operate in the capacity of a server or a client machine in a server-client network environment, or as a peer machine in a peer-to-peer for distributed) network environment. The machine 900 may be a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 960 (e.g., a central processing unit (CPU), a graphics processing unit (GPU) or both), a main memory 970 and a static memory 980, all of which communicate with each other via a bus 908. The computer system 900 may further include a video display unit 910 (e.g., liquid crystal displays (LCD) or cathode ray tube (CRT)). The computer system 900 also may include an alphanumeric input device 920 (e.g., a keyboard), a cursor control device 930 (e.g., a mouse), a disk drive unit 940, a signal generation device 950 (e.g., a speaker), and a network interface device 990.

The disk drive unit 940 may include a machine-readable medium 922 on which is stored one or more sets of instructions (e.g., software 924) embodying any one or more of the methodologies or functions described herein. The software 924 may also reside, completely or at least partially, within the main memory 970 and/or within the processor 960 during execution thereof by the computer system 900, the main memory 970 and the processor 960 also constituting machine-readable media.

The software 924 may further be transmitted or received over a network 780 via the network interface device 990.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

Figure 10:
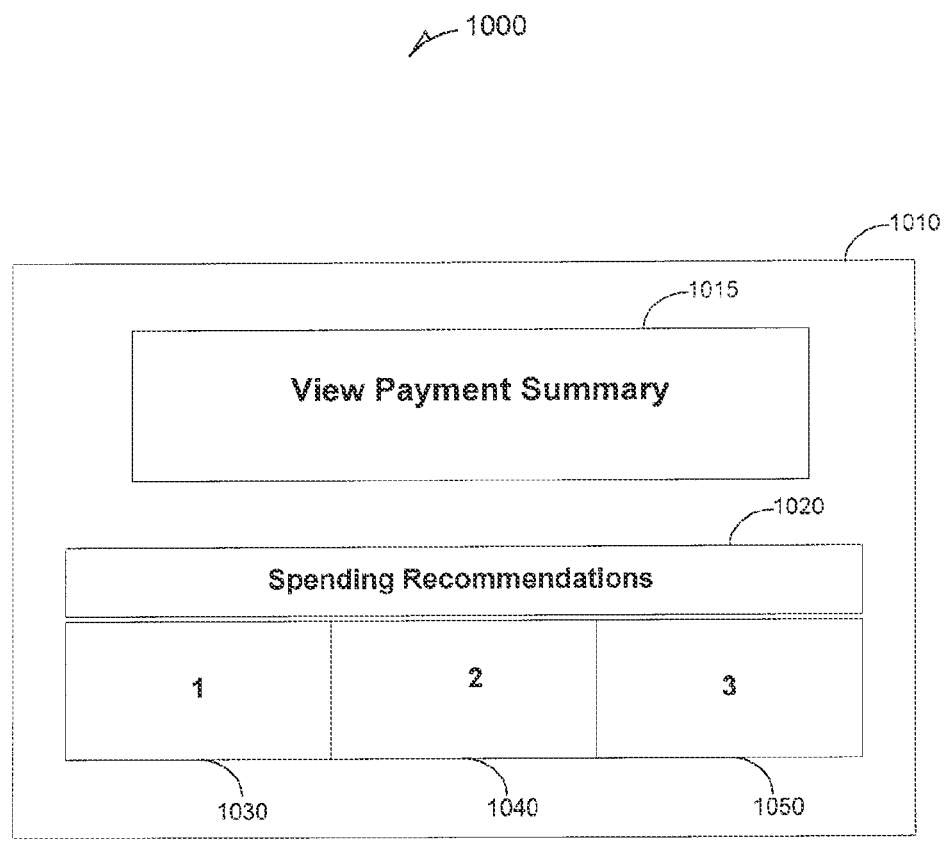
FIG. 10 is a screen shot illustrating, in an example embodiment, a page prepared by the payment system to be displayed to a user after receiving a payment for the user from another party

FIG. 10 is a screen shot illustrating, in an example embodiment, a page 1000 prepared by the payment system 110 to be displayed to a user (e.g., the second party 150) after receiving a payment for the user from another party (e.g., the first party 130). The page 1000 may be shown to the user after the user logs into the payment system 110. The user may log into the payment system 110 following receiving an email or a text message from the payment system indicating that the user has received an amount sent to the user by a sender.

In an example embodiment, the page may include a view window 1010 including a View Payment Summary portion 1025, a contextual recommendations window 1020, and three spaces 1030, 1040 and 1050 for recommendations 1, 2, and 3. In the View Payment Summary 1015, a brief description of the payment, including an amount and an email a phone number associated with the sender may be displayed to the user. In the recommendation spaces 1030-1040 three contextual recommendations may be displayed. The contextual recommendations may include suggestion regarding taking one or more actions such as shopping from a merchant that may pay a referral tee or at an affiliate online store (e.g. PAYPAL shops), ordering from a catalog, saving in an account (e.g., a PAYPAL account), investing in a fund (e.g., money market funds) or applying for a card (e.g., a credit or a debit card).

Thus, a computerized method and system for contextual spending in person-to-person payments have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computerized method comprising:
   receiving, at a payment system, a request associated with a first party to make a payment to a second party;
   evaluating, by one or more recommendation applications executed by at least one computer processor, recommendations for utilizing the payment, the recommendations based on a spending behavior of the second party, the spending behavior of the second party including at least one of preferring a certain shop, preferring a group of shops, preferring a method of payment, and having applied for certain credit cards; and
   from the payment system, sending the payment and a recommendation for utilization of the payment to the second party.

2. The computerized method of claim 1, including:
   requesting from the first party an instruction related to charging a transaction fee associated with the payment; and
   receiving from the first party the instruction related to charging the transaction fee associated with the payment.

3. The computerized method of claim 2, wherein the receiving of the instruction results in determining shares of the transaction fee to be charged to each of the first and the second party.

4. The computerized method of claim 1, wherein the first party includes a commercial entity.

5. The computerized method of claim 1, wherein the first party includes a person.

6. The computerized method of claim 1, wherein the sending of the utilization recommendation to the second party includes sending a recommendation based on a profile of the second party.

7. The computerized method of claim 6, wherein the profile of the second party includes at least one of a geographic location, a spending, behavior, an investment portfolio, a financial standing, and interests.

8. The computerized method of claim 6, including obtaining the profile of the second party from a source including at least one of: a database associated with the payment system, a database associated with a publication system storing transactions associated with the second party, and a public commercial database.

9. The computerized method of claim 1, wherein the recommendation that is sent is for an action including at least one of:
   shopping at a physical store,
   shopping at an online store,
   ordering from a catalog,
   saving in an account,
   ordering a credit card,
   ordering a debit card, and
   investing in a fund.

10. A system comprising:
   One or more computer processors configured to:
      use a communication module at a payment system to receive a request from a first party to make a payment to a second party;
      use one or more recommendation applications to evaluate recommendations, the recommendations based on the spending behavior of the second party, the spending behavior including at least one of preferring a certain shop or a group of shops, preferring a method of payment, and having applied for certain credit cards;
      use a transaction module to send the payment to the second party;
      use at least one of the one or more recommendation applications to generate a recommendation for utilization of the payment from the evaluated recommendations; and
      use the communication module to communicate the recommendation to the second party.

11. The system of claim 10 wherein the communication module is to request from the first party an instruction related to charging a transaction fee associated with the payment.

12. The system of claim 11 wherein the communication module is to receive from the first party an instruction related to charging the transaction fee associated with the payment.

13. The system of claim 12, wherein the transaction module is to determine shares of the transaction fee to be charged to each of the first and the second party based on the instruction.

14. The system of claim 10 wherein at least one of the one or more computer processors is to generate the recommendation based on a profile of the second party.

15. The system of claim 14 wherein at least one of the one or more computer processors is to obtain the profile of the second party from a source including at least one of: a database associated with the payment system, a database associated with a publication system storing transactions associated with the second party, and a public commercial database.

16. The system of claim 14 wherein at least one of the one or more computer processors is to generate the recommendation of an action, the action includes at least one of:
   shopping at a physical store, shopping at an online store,
ordering from a catalog,
saving in an account,
ordering a credit card,
ordering a debit card, and
investing in a fund.

17. A machine-readable non-transitory storage device comprising instructions, which when implemented by one or more computer processors perform the following operations:
receiving a request associated with a first party to make a payment to a second party;
evaluating recommendations for utilizing the payment, the recommendations based on a spending behavior of the second party, the spending behavior of the second party including at least one of preferring a certain shop or a group of shops, preferring a method of payment, and having applied for certain credit cards; and
sending the payment and a recommendation for utilization of the payment to the second party.

18. The machine-readable storage device of claim 17, the operations further including:
requesting from the first party an instruction related to charging a transaction fee associated with the payment.

19. The machine-readable storage device of claim 18, the operations further including:
receiving from the first party the instruction related to charging a transaction fee associated with the payment, the instruction including determining shares of the transaction fee to be charged to each of the first and the second party.

20. The machine-readable storage device of claim 17, the operations further including:
sending of the recommendation based on a profile of the second party.

21. The machine readable storage device of claim 20 wherein the profile of the second party includes at least one of a geographic location, a spending behavior, an investment portfolio, a financial standing, and interests.

22. The machine-readable storage device of claim 17 wherein the recommendation includes an action including at least one of:
shopping at a physical store,
shopping at an online store,
ordering from a catalog,
saving in an account,
ordering a credit card,
ordering a debit card, and
investing in a fund.

* * * * *